W. T. HENSLEY.
DYNAMO ELECTRIC MACHINE.
APPLICATION FILED JUNE 8, 1912.

1,255,607.

Patented Feb. 5, 1918.
4 SHEETS—SHEET 1.

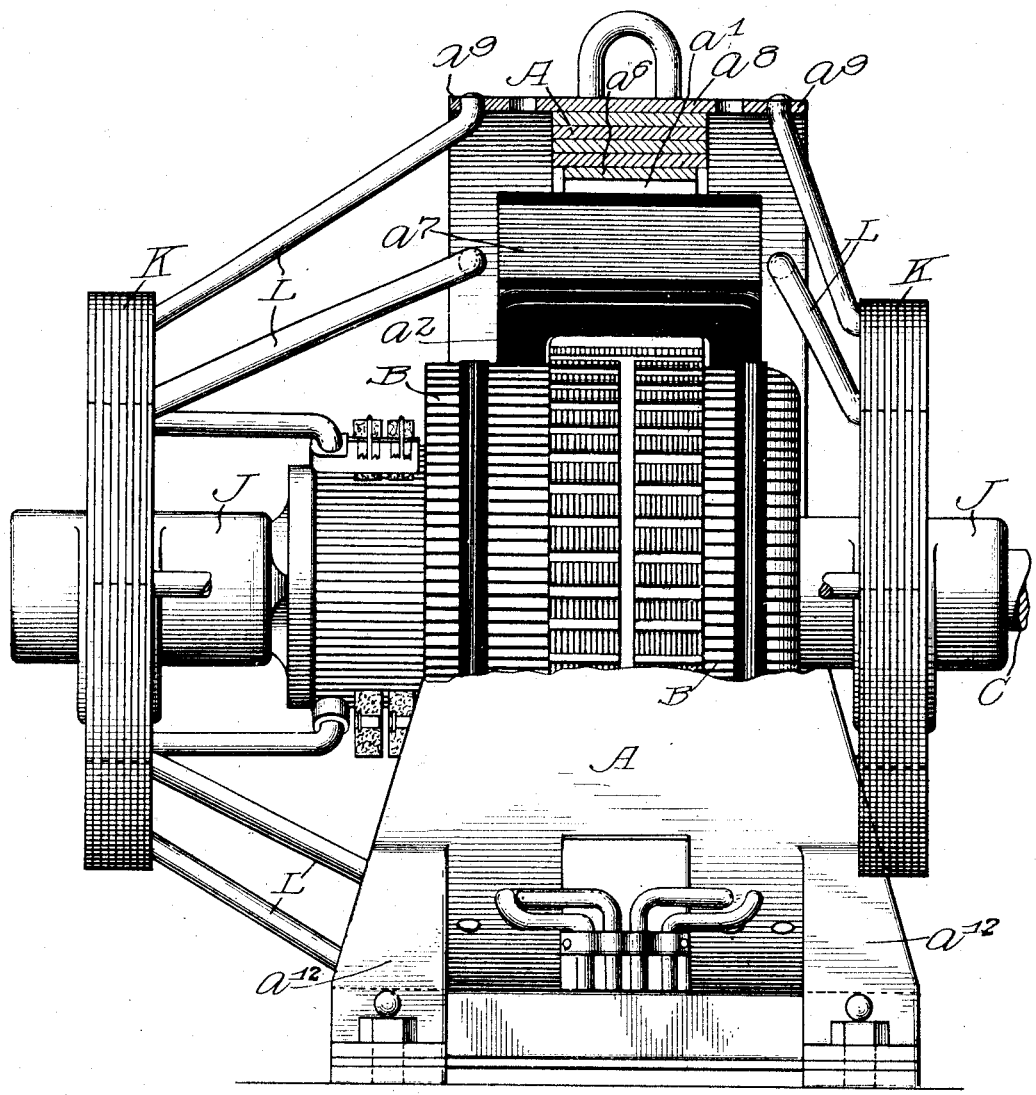

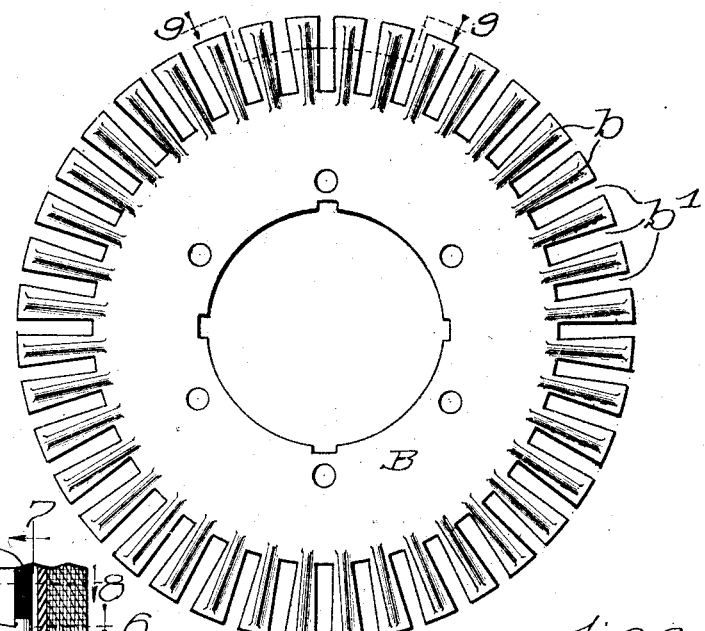
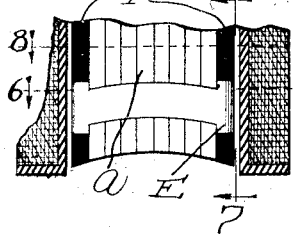
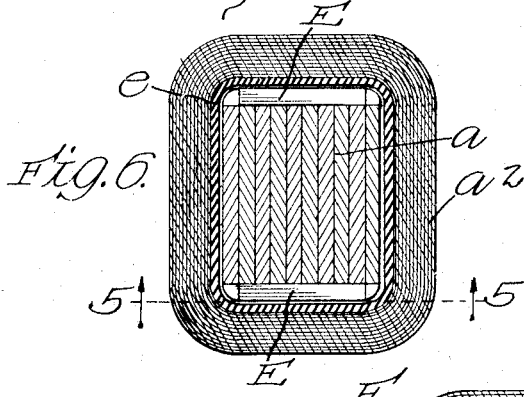
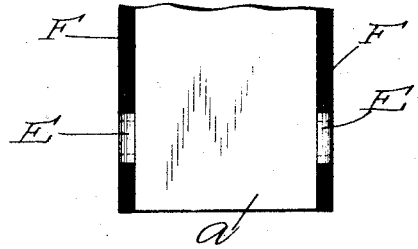
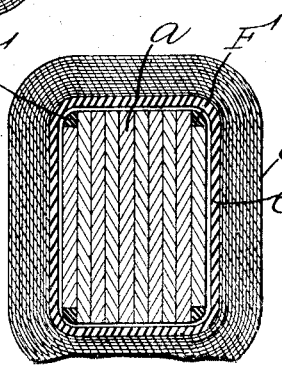

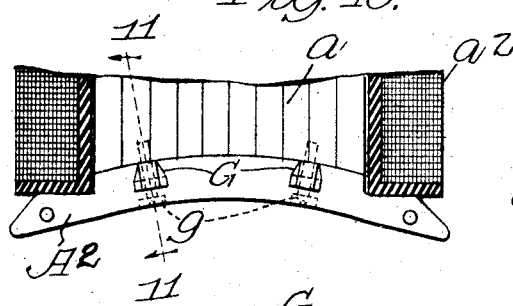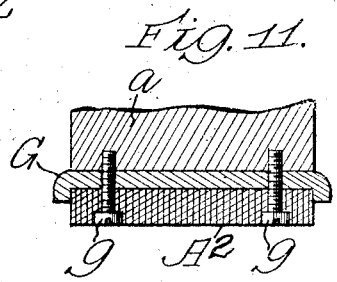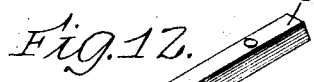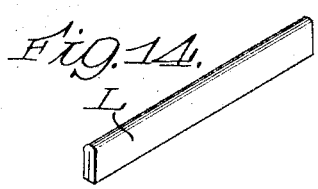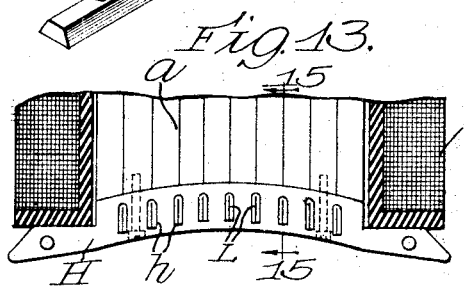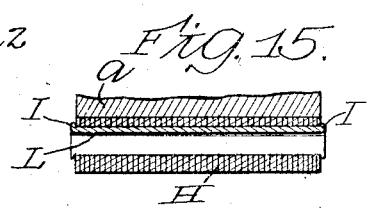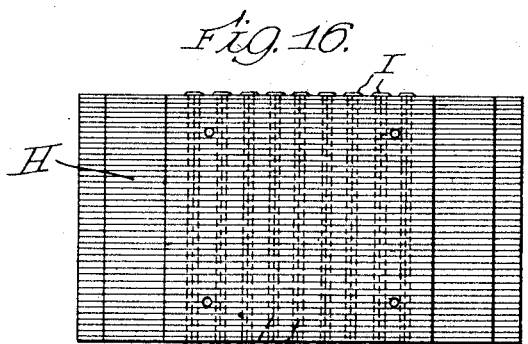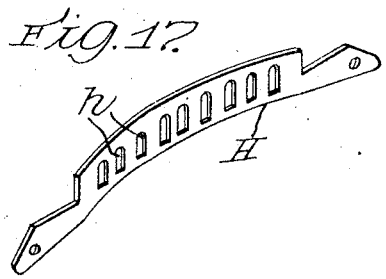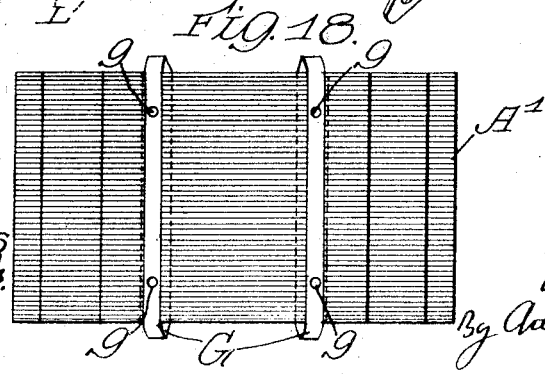

UNITED STATES PATENT OFFICE.

WILLIAM T. HENSLEY, OF CONNERSVILLE, INDIANA, ASSIGNOR, BY MESNE ASSIGNMENTS, TO BOUND BROOK ENGINE & MFG. CO., A CORPORATION OF DELAWARE.

DYNAMO-ELECTRIC MACHINE.

1,255,607.        Specification of Letters Patent.        Patented Feb. 5, 1918.

Application filed June 8, 1912. Serial No. 702,496.

*To all whom it may concern:*

Be it known that I, WILLIAM T. HENSLEY, a citizen of the United States of America, and resident of Connersville, Fayette county, Indiana, have invented a certain new and useful Improvement in Dynamo - Electric Machines, of which the following is a specification.

My invention relates to dynamo electric machines of the kind described in my prior application Serial No. 628,904, filed by me on May 23, 1911.

In said prior application I have shown and described, and claimed broadly, a novel construction involving the use of sheet metal in the manufacture of generators and motors. Both the field and the armature are, as described in said application, constructed from sheet metal, whereby the use of heavy and expensive castings is avoided. My present invention relates more particularly to the method of using sheet metal in the construction of the dynamo electric machine of this particular character.

Objects of my invention are to provide a novel construction whereby the laminæ of the field, or of other elements of the machine, are united at their edges by welding; to provide a novel form of laminated pole piece for the main poles of the machine; to provide novel and improved means for holding together the laminæ of the main poles of the machine; to provide a novel and improved construction of the laminated armature, whereby the latter is stronger and less liable to have the laminæ thereof distorted or bent out of shape; to provide a novel and improved construction of the main poles of the machine, by insertion of compensating conductors between the laminæ of the poles, or in the shoe or pole piece thereof; and to provide certain details and features of improvement tending to increase the general efficiency and serviceability of a dynamo electric machine having a laminated field and armature of this particular character.

To the foregoing and other useful ends my invention consists in matters hereinafter set forth and claimed.

In the accompanying drawings Figure 1 is a side elevation of a direct current dynamo electric machine embodying the principles of my invention, with the upper portion thereof shown in transverse vertical section.

Fig. 3 is a side elevation of the machine shown in Fig. 1, with the upper portion of the field shown in longitudinal vartical section.

Fig. 4 is an enlarged side elevation of one of the sheet metal rings or laminæ of the armature.

Fig. 5 is a detail sectional view showing a key for holding together the laminæ of the main pole.

Fig. 6 is a section on line 6—6 in Fig. 5, the said Fig. 5 being a section on line 5—5 in Fig. 6.

Fig. 7 is a section on line 7—7 in Fig. 5.

Fig. 8 is a section on line 8—8 in Fig. 5.

Fig. 9 is an enlarged detail section on line 9—9 in Fig. 4.

Fig. 10 is a detail sectional view of one of the main poles of the machine, on a larger scale, showing the method of fastening the laminated pole piece to the laminated pole.

Fig. 11 is a section on line 11—11 in Fig. 10.

Fig. 12 is a perspective of one of the keys shown in Figs. 10 and 11.

Fig. 13 is a view similar to Fig. 10, but showing a different method of fastening the laminated pole piece to the laminated pole.

Fig. 14 is a perspective of one of the folded sheet metal keys shown inserted through the laminæ of the pole piece shown in Fig. 13.

Fig. 15 is a detail section on line 15—15 in Fig. 13.

Fig. 16 is a bottom or face view of the pole piece shown in Fig. 13.

Fig. 17 is a perspective of one of the plates or laminæ employed in the construction of the pole piece shown in Figs. 13 to 16 inclusive.

Fig. 18 is a top plan view of the pole piece shown in Fig. 10.

Figure 1:
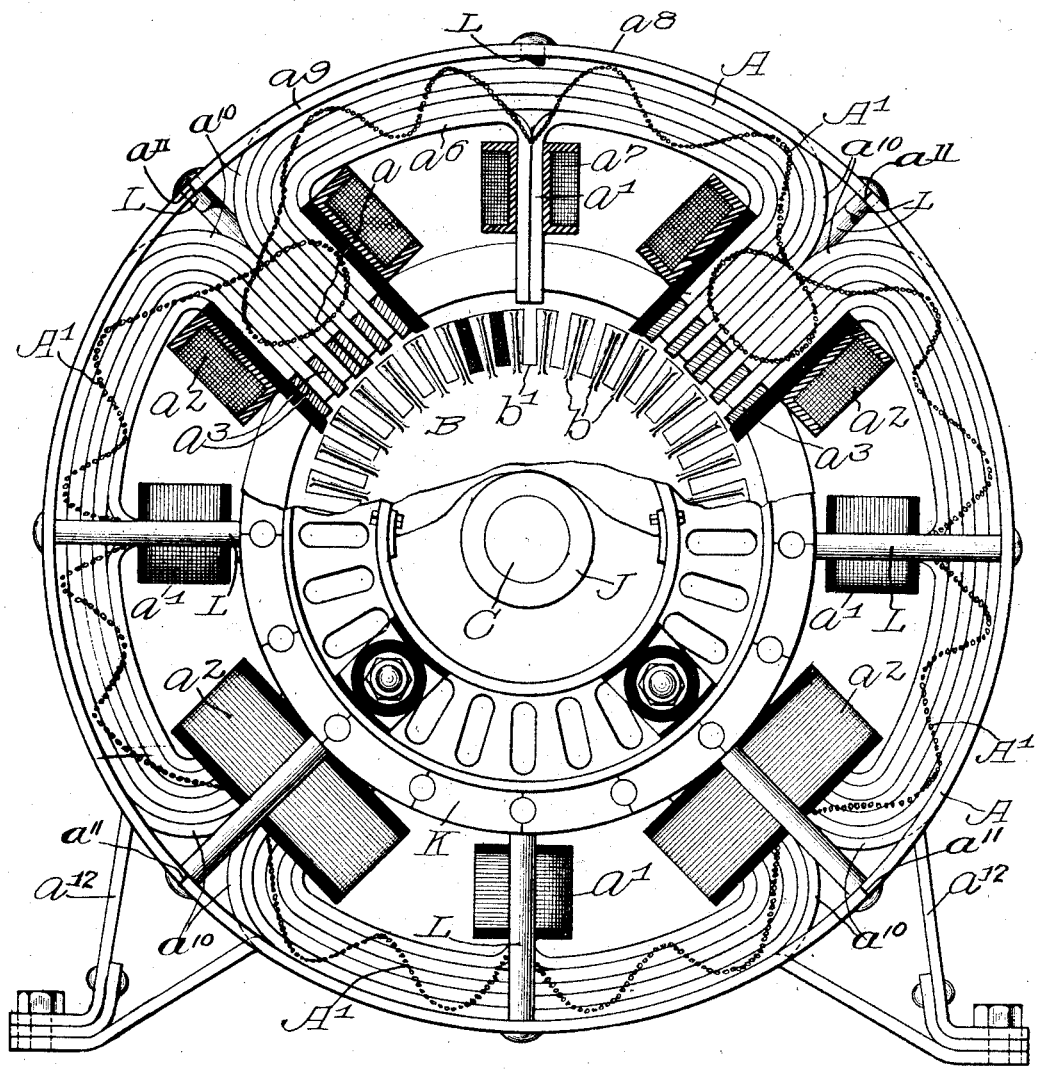
Figure 2:
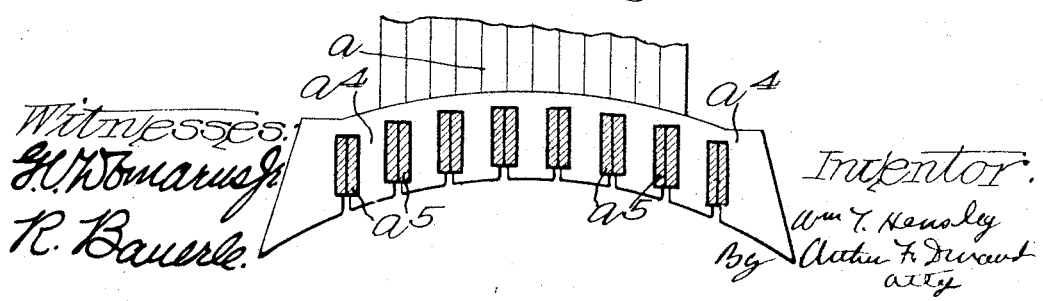
Fig. 2 is a side elevation of a laminated pole piece or shoe having compensating conductors.

As thus illustrated, and referring to Figs. 1 to 3 inclusive, it will be seen that a dynamo electric machine embodying my invention comprises a laminated field frame A, the laminæ being concentric with the axis of the machine, except where the meeting ends of the sections of the field are turned inward and toward the said axis to form the main poles $a$ and the so-called inter-poles $a^1$. In this way the laminæ of the poles of the field are disposed in planes parallel with the axis of the machine. The main poles are provided with the windings $a^2$ and the compensating conductors $a^3$, which latter are held between the laminæ of the poles in any suitable or desired manner. These conductors $a^3$ may be of steel or copper, and they are insulated from the frame or field and connected in circuit in the well known manner, whereby they balance the effect the armature turns have on the field. As shown, the conductors $a^3$, are inserted between the laminæ of the pole $a$, every other thickness of the sheet metal being cut away to afford room for the said conductors, and the latter having their outer ends connected with the leads to the other poles. As shown in Fig. 2, the pole $a$ has a laminated pole piece or shoe $a^4$, the laminæ thereof extending in planes at right angles to the axis of the machine. The compensating turns or conductors $a^5$ are inserted transversely through this pole piece in the manner illustrated, and may be of either copper or steel, being insulated from the field and pole structure. The ends of these conductors $a^5$ are, of course, connected with the leads or circuit wires in the ordinary or any suitable manner. As shown, each conductor is disposed in a groove formed in the face of the pole piece $a^4$, said groove being narrowed at the point where it opens at the face of the pole piece.

As a matter of special improvement, the laminæ or sheet metal layers of the field and poles are secured together by uniting or welding their outer edges. For example, and as shown in Fig. 1, the sides of the field may be provided with a path or line of welding $A^1$ extending back and forth across the edges of the laminæ, whereby the sheet metal layers are practically converted into a solid body. It will be understood that this welding may be done in any suitable, known or approved manner. For example, by any of the well known electrical methods of welding. In this way the sheet metal layers or laminæ of the field and poles are bound tightly together without the use of screws or rivets or other fastening devices.

It will also be seen that a dynamo electric machine embodying the principles of my invention involves an armature B, the body of said armature being composed of sheet metal plates substantially ringlike in form, each plate having an opening at the center thereof, to accommodate the shaft C, and each plate or layer of sheet metal having its outer end formed with notches which provide the armature with parallel grooves for the reception of the coils or windings D, which latter may be of any suitable, known or approved character. It will be seen that these notches or grooves which hold the armature coils or windings are of some depth and are separated by laminated walls of paramagnetic metal, and with a view to enabling these walls to hold their shape, the two outer laminæ or sheet metal layers are provided with radial ribs $b$, each rib being disposed between two of the notches $b^1$ with which all of the plates are provided in the manner described. These rotary ribs $b$ so strengthen the narrow metal portions existing between the notches $b^1$ that they are not liable to be laterally deflected, and the result is that the laminated body of the armature is rendered stronger and more rigid in those portions which receive and hold the coils or windings of the armature.

As shown in Figs. 5 to 8, inclusive, the main pole $a$ of the field has the side edges of the laminæ thereof provided with a curved groove to receive a flat key E, there being one of these keys at each side of the pole, and each key being enlarged at its ends, said ends being in the recesses formed at the corners of the pole by the reduction in width of the outer laminæ of the field. These keys, by reason of their enlarged heads or ends, serve to bind or hold the laminæ of the pole tightly together and both keys are held in place inside of the insulator $e$ which extends around the pole, and which carries the coil or winding of the pole, by driving or forcing them into the curved grooves thus made for them in the sides of the pole. It will also be seen that the side edges of the two outermost layers or laminæ of the said poles $a$ are set inward slightly to accommodate the fillings F, which latter are pieces of insulation inserted in place to form the corners of the pole, whereby the insulation carrying the coil or winding of the pole is more satisfactorily and effectually applied and combined with the pole, each corner of the pole being formed from a rounded piece of insulation which bears against the spool like insulating member which carries the coil or winding. Thus the pole is devoid of sharp metallic corners which might injure the coil or winding or interfere with the proper construction of the pole.

As a matter of further and special improvement, it will be seen that the corner recesses, which receive the insulation F are formed by making the innermost layers or laminæ $a^6$ of the field sections narrower than the others. Also, it will be seen that these layers or laminæ $a^6$ are inturned and form the inter-poles $a^1$, which latter have windings $a^7$ of any suitable character. Thus the laminæ of the interpoles extend into the field and terminate in the main poles. The laminæ which form the cores of the interpoles have their other ends disposed in position to form the outer laminæ of the cores of the main poles. Thus an uninterrupted magnetic path is provided for the interpoles magnetism.

As shown in Figs. 10 to 12, inclusive, and Fig. 18, the main pole *a* has the laminated pole piece A² provided on its outer surface with transverse grooves of a dove-tailed character in which similarly shaped keys or bars G are inserted, these keys or bars extending through and across the edges of the laminæ of the pole piece, and thereby serving to prevent relative displacement thereof. The pole piece is secured in place to the poles by means of screws *g* inserted through the pole piece and the bars or keys G and into the end edges of the laminæ of the pole. In this way the structure of the pole piece is rendered very firm and solid and the edges of the laminæ thereof are held close together to form the slightly concave or hollow face of the pole.

As shown in Figs. 13 to 18, inclusive, the main pole *a* is provided with a laminated pole piece H having transverse and flattened openings *h* formed therein as shown more clearly in Fig. 17. These openings extend through the laminæ of the pole piece in directions parallel with the axis of the machine. Folded sheet metal keys L, of the kind shown in Fig. 14, are then inserted through the openings *h*, and the ends of said keys are then riveted over to hold them in place. Referring to Fig. 16, it will be seen that these keys are parallel and extend transversely through the pole piece and serve as tie rods for binding or clamping the laminæ of the pole piece tightly together. A pole piece of this character can be secured to the pole by any suitable or desired means. Thus constructed the pole piece has no tendency toward detrimental electrical action, such as armature distortion.

The casing of the machine is formed by the outer laminæ $a^8$ of the field sections, which layers of sheet metal are made wider than the others to form an imperforate overhang $a^9$ at each end of the machine. The casing thus formed is held firmly in place by reason of the fact that the end portions $a^{10}$ of these outer layers are inturned to form part of the main poles. The casing is formed at the bottom with integral legs $a^{12}$ of suitable form and character. The edges of the casing sections meet at $a^{11}$ to form the practically continuous and cylindric outer surface for the laminated body frame thus provided.

The shaft C is supported in suitable housings J, and the latter are mounted in bracket rings K of any desired character. As shown, these rings are supported by rods L which are secured at their other ends to the overhang $a^9$ of the casing.

With the construction shown and described, as illustrated in Figs. 1, 2, 10 and 13, the main poles of the field structure have metal strips inserted in the end portions of the poles, which strips are spaced apart and arranged parallel with the axis of the machine. These strips may be merely for structural purposes, to hold the laminæ of the pole together, or for electrical purposes, such as compensating conductors suitably connected in the circuits of the machine, as previously described.

What I claim as my invention is—

1. A dynamo electric machine provided with a field structure comprising a body of laminated paramagnetic metal, the laminæ being arranged parallel with the axis of the machine and being welded together at the edges thereof to form a rigid body frame for the machine, and supporting feet for the machine, formed from the outer laminæ of the body, whereby an additional supporting casing is unnecessary.

2. A dynamo electric machine provided with a laminated field structure, having the laminæ united at the edges thereof to form a rigid frame for the machine, supporting feet for the machine, formed from the outer laminæ of the body, and means connected with the outer laminæ for supporting the parts of the machine, whereby an additional supporting casing is unnecessary.

3. A dynamo electric machine provided with a laminated field structure having the laminæ united at the edges thereof, said laminæ being formed so that they provide a rigid body frame for the machine, said field structure having poles in which the laminæ are disposed in planes parallel with the axis of the machine, and with the edges adjacent to the inner end of the pole, the laminæ between the poles being disposed cylindrically one outside of the other and concentrically to said axis, supporting feet for the machine, formed from the outer laminæ of the field structure, and means connected with the outer laminæ for supporting the parts of the machine, whereby an additional supporting casing is unnecessary.

4. A dynamo electric machine provided with a laminated pole of paramagnetic metal, the laminæ being disposed in planes parallel with the axis of the machine, and with the edges thereof forming the face of the pole, a winding for said pole, and compensating conductors inserted between the laminæ of the pole, at the said face thereof, some of said laminæ being shorter than others to accommodate said conductors.

5. A dynamo electric machine provided with a laminated pole of paramagnetic metal, the laminæ being disposed in planes parallel with the axis of the machine, and with the edges thereof forming the face of the pole, a winding for said pole, compensating conductors inserted between the laminæ of the pole, at the said face thereof, some of said laminæ being shorter than others to accommodate said conductors, a laminated field structure for said pole, and other similar poles on said field structure, the laminæ between the poles being disposed cylindrically one outside of the other and concentrically to said axis.

6. A dynamo electric machine comprising a laminated field structure of paramagnetic metal, main poles formed by the inturned ends of the laminæ, and interpoles formed by the inturned ends of certain of said laminæ.

7. A dynamo electric machine comprising a laminated field structure of paramagnetic metal, main poles formed by the inturned ends of the laminæ, the laminæ forming the outer, opposite surfaces of the main poles being narrower than the laminæ forming the body of said main poles, whereby corner recesses are formed in the main poles, the narrower laminæ, which form the outer, facing surfaces of two adjacent main poles meeting and being inturned at one of their ends, thus forming inter-poles, and insulation suitably secured in the recesses of said main poles.

8. A dynamo electric machine comprising a laminated field structure of paramagnetic metal, main poles formed by the inturned ends of the laminæ, and interpoles formed by the inturned ends of certain of said laminæ, the laminæ in the poles being disposed in planes parallel with the axis of the machine, and the laminæ in the field between poles being disposed cylindrically one outside of the other and concentrically to said axis.

9. A dynamo electric machine comprising a laminated field structure of paramagnetic metal, main poles formed by the inturned ends of the laminæ, the laminæ forming the outer, opposite surfaces of the main poles being narrower than the laminæ forming the body of said main poles, whereby corner recesses are formed in the main poles, the narrower laminæ, which form the outer, facing surfaces of two adjacent main poles meeting and being inturned at one of their ends, thus forming inter-poles, insulation suitably secured in the recesses of said main poles, the laminæ in the poles being disposed in planes parallel with the axis of the machine, and the laminæ in the field between the poles being disposed cylindrically one outside of the other and concentrically to said axis.

10. A dynamo electric machine comprising a laminated field structure, poles formed by the inturned ends of the laminations of said field structures, the laminæ of said poles being disposed in planes parallel with the axis of the machine, the laminæ forming the outer, opposite surfaces of the poles being narrower than the laminæ forming the body of said poles, whereby corner recesses are formed in the poles and insulation suitably secured in the recesses of said poles.

11. A dynamo electric machine comprising a laminated field, the outer laminæ forming the casing of the machine, said casing having an imperforate overhang at each end thereof, supporting feet for the machine, formed from the outer laminæ of the casing, and means connected with the outer laminæ for supporting the parts of the machine, whereby an additional supporting casing is unnecessary.

12. A dynamo electric machine comprising a body frame in the form of a ring composed of sections having inturned ends secured together to form the main poles of the field structure, windings on said inturned ends, said sections being each composed of laminated paramagnetic metal, the inner laminæ of said sections being extended inward to form interpoles, windings on said interpoles, an armature shaft, bearings for said shaft, and means whereby said bearings are supported by said laminated body frame.

13. A dynamo electric machine comprising a body frame in the form of a ring composed of sections having inturned ends secured together to form the main poles of the field structure, windings on said inturned ends, said sections being each composed of laminated paramagnetic metal, the inner laminæ of said sections being extended inward to form interpoles, windings on said interpoles, an armature shaft, bearings for said shaft, and means whereby said bearings are supported by said laminated body frame, the outer laminæ of said frame being constructed to form a cylindric casing for the machine.

14. A dynamo electric machine comprising a body frame in the form of a ring composed of sections having inturned ends secured together to form the main poles of the field structure, windings on said inturned ends, said sections being each composed of laminated paramagnetic metal, the inner laminæ of said sections being extended inward to form interpoles, windings on said interpoles, an armature shaft, bearings for said shaft, and means whereby said bearings are supported by said laminated body frame, the outer laminæ of said frame being constructed to form a cylindric casing for the machine, and portions of said casing extending into said main poles at the center of each pole.

15. A dynamo electric machine comprising a body frame in the form of a ring composed of sections having inturned ends secured together to form the main poles of the field structure, windings on said inturned ends, said sections being each composed of laminated paramagnetic metal, the inner laminæ of said sections being extended inward to form interpoles, windings on said interpoles, an armature shaft, bearings for said shaft, and means whereby said bearings are supported by said laminated body frame, said main poles having end portions provided with metal strips therein, said strips being spaced apart and extending parallel with said shaft.

16. A dynamo electric machine comprising a body frame in the form of a ring composed of sections having inturned ends secured together to form the main poles of the field structure, windings on said inturned ends, said sections being each composed of laminated paramagnetic metal, the inner laminæ of said sections being extended inward to form interpoles, windings on said interpoles, an armature shaft, bearings for said shaft, and means whereby said bearings are supported by said laminated body frame, said means including rods secured to the outside layer of the body frame, and said laminæ being rigidly united to stiffen the body frame.

Signed by me at Connersville, Ind., this 29th day of May, 1912.

WILLIAM T. HENSLEY.

Witnesses:
MATIE S. MOORE,
WILLIAM E. OCHILTREE.

Copies of this patent may be obtained for five cents each, by addressing the "Commissioner of Patents, Washington, D. C."